US007716158B2

(12) United States Patent
McConnell

(10) Patent No.: US 7,716,158 B2
(45) Date of Patent: May 11, 2010

(54) SYSTEM AND METHOD FOR CONTEXT SENSITIVE SEARCHING

(75) Inventor: Christopher C. McConnell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 10/754,984

(22) Filed: Jan. 9, 2004

(65) Prior Publication Data

US 2005/0154711 A1    Jul. 14, 2005

(51) Int. Cl.
*G06F 7/00* (2006.01)
(52) U.S. Cl. ............... 707/3; 707/2; 707/4; 707/104.1; 707/5; 707/10
(58) Field of Classification Search ..................... 707/3, 707/104.1, 100, 10, 1, 5, 4
See application file for complete search history.

(56) References Cited

U.S. PATENT DOCUMENTS

| | | | | |
|---|---|---|---|---|
| 5,263,167 A * | 11/1993 | Conner et al. | ................... | 707/4 |
| 5,701,469 A * | 12/1997 | Brandli et al. | .............. | 707/102 |
| 5,715,468 A * | 2/1998 | Budzinski | ...................... | 704/9 |
| 6,189,002 B1 * | 2/2001 | Roitblat | ......................... | 707/1 |
| 6,249,784 B1 * | 6/2001 | Macke et al. | ................... | 707/3 |
| 6,260,037 B1 * | 7/2001 | Bestgen et al. | ................. | 707/4 |
| 6,327,590 B1 * | 12/2001 | Chidlovskii et al. | ............. | 707/5 |
| 6,487,553 B1 * | 11/2002 | Emens et al. | ................... | 707/5 |
| 6,493,702 B1 * | 12/2002 | Adar et al. | ...................... | 707/3 |
| 6,519,592 B1 * | 2/2003 | Getchius et al. | ................ | 707/6 |
| 6,529,909 B1 * | 3/2003 | Bowman-Amuah | .......... | 707/10 |
| 6,539,396 B1 * | 3/2003 | Bowman-Amuah | ..... | 707/103 R |
| 6,557,008 B1 * | 4/2003 | Temple et al. | ............ | 707/104.1 |
| 6,633,867 B1 * | 10/2003 | Kraft et al. | ...................... | 707/3 |
| 6,650,998 B1 * | 11/2003 | Rutledge et al. | ............ | 701/211 |
| 6,691,106 B1 * | 2/2004 | Sathyanarayan | ................ | 707/3 |
| 6,810,395 B1 * | 10/2004 | Bharat | ........................... | 707/4 |
| 6,892,196 B1 * | 5/2005 | Hughes | .......................... | 707/4 |
| 6,906,719 B2 * | 6/2005 | Chadha et al. | ............... | 345/473 |
| 6,968,332 B1 * | 11/2005 | Milic-Frayling et al. | ........ | 707/3 |
| 6,968,333 B2 * | 11/2005 | Abbott et al. | ................... | 707/3 |
| 6,976,017 B1 * | 12/2005 | Getchius | ......................... | 707/3 |

(Continued)

OTHER PUBLICATIONS

Finkelstein, L. et al., "Placing Search in Context: The Concept Revisited", *Proceedings of the 10th International Conference on World Wide Web*, 2001, 406-414.

(Continued)

*Primary Examiner*—Hosain T Alam
*Assistant Examiner*—Leon Harper
(74) *Attorney, Agent, or Firm*—Woodcock Washburn LLP

(57) ABSTRACT

A method and system which allow the addition of context into a search involves the use of state monitors in the computing environment. The state monitors record information such as the installed hardware, software, user preferences, and operating modes. The state information is used to modify information gathered via a user search to make the search results more relevant to the user in the context of his computing environment. The monitors, along with logical operators and variables, assess the current state of the machine and modify the displayed search results by excluding irrelevant information, biasing up information relevant to the computing environment and biasing down other information less relevant to the computing environment.

19 Claims, 5 Drawing Sheets

U.S. PATENT DOCUMENTS

| | | | |
|---|---|---|---|
| 7,305,380 B1* | 12/2007 | Hoelzle et al. | 707/3 |
| 7,506,257 B1* | 3/2009 | Chavez et al. | 715/714 |
| 7,519,578 B2* | 4/2009 | Mihai et al. | 707/3 |
| 7,523,095 B2* | 4/2009 | Gates et al. | 707/3 |
| 2002/0073057 A1* | 6/2002 | Benoit et al. | 707/1 |
| 2002/0087535 A1* | 7/2002 | Kotcheff et al. | 707/5 |
| 2002/0138479 A1* | 9/2002 | Bates et al. | 707/5 |
| 2002/0169856 A1* | 11/2002 | Plow et al. | 709/220 |
| 2002/0194166 A1* | 12/2002 | Fowler | 707/3 |
| 2003/0144911 A1* | 7/2003 | Lin-Hendel | 705/26 |
| 2003/0217052 A1* | 11/2003 | Rubenczyk et al. | 707/3 |
| 2003/0220908 A1* | 11/2003 | Chou | 707/3 |
| 2003/0229900 A1* | 12/2003 | Reisman | 725/87 |
| 2004/0194141 A1* | 9/2004 | Sanders | 725/53 |
| 2005/0065773 A1* | 3/2005 | Huang et al. | 704/7 |
| 2005/0097188 A1* | 5/2005 | Fish | 709/217 |

OTHER PUBLICATIONS

Tsuji, S. et al., "A Framework to Provide Integrated Online Documentation", *ACM Special Interest Group for Design of Communications, Proceedings of the 19th Annual International Conference on Computer Documentation*, 2001, 185-192.

\* cited by examiner

100

SYSTEM AND METHOD FOR CONTEXT SENSITIVE SEARCHING

FIELD OF THE INVENTION

This invention relates in general to the field of information technology. More particularly, this invention relates to a computing environment context to facilitate searches for information.

BACKGROUND OF THE INVENTION

Search engines are now commonplace in many software applications. Search engines may be used for searching for text strings in applications such as word processors, help information in software applications as varied as spreadsheets and operating systems, and references and other documents. The accuracy of any one search may be judged by whether the top few returned documents are the documents actually sought by the user using the search engine. Thus, the returned list must have relevance to the search terms used in the search.

Search results that are irrelevant to the user are undesirable because the user may find herself wasting time sorting through documents that do not have applicability to either her or her computing environment. Ranking mechanisms are typically employed to rank the returned data from a search so that the most relevant documents are listed first. However, the ranking system may not perform well unless the ranking has some correlation to the context of the request for information. Some returned information is so irrelevant to the context of the user in her computing environment that it should be completely eliminated from the returned search list. Other returned search data may have increased relevance because the user may be searching for a way to better utilize the computing environment in which she is operating. Thus, an understanding of the computing environment may provide an insight into the context of a users search.

It is desirable for a search engine to have a capability to include context information concerning the computing environment in which the search is conducted. Thus, there is a need for a system and method to include context into search results so as to provide a computer user results which may be more relevant to his needs. The present invention addresses the aforementioned needs and solves them with additional advantages as expressed herein.

SUMMARY OF THE INVENTION

A method and system are discussed which allow the addition of context into search results. In one embodiment, a search of help topics may be modified by the use of state monitors in the computing environment. The state monitors record such information as the installed hardware in a computing environment, the installed software, user preferences, and operating modes. This state information may be used as context from which to modify or perform searches for information which may be related to the user operating within his computing environment. The monitors, along with logical operators and variables assess the current state of the machine for the benefit of the search being conducted.

In one embodiment, information resulting from a search of help topics may be modified after the search is completed. The modifications to the initial search results include the capability to filter out, include, bias up in ranking or bias down in ranking items of the results. The modifications made are based on the state of hardware and software elements of the user computing environment and may make the content more relevant to the user operating within his computing environment.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Embodiments of the Invention

Figure 1:
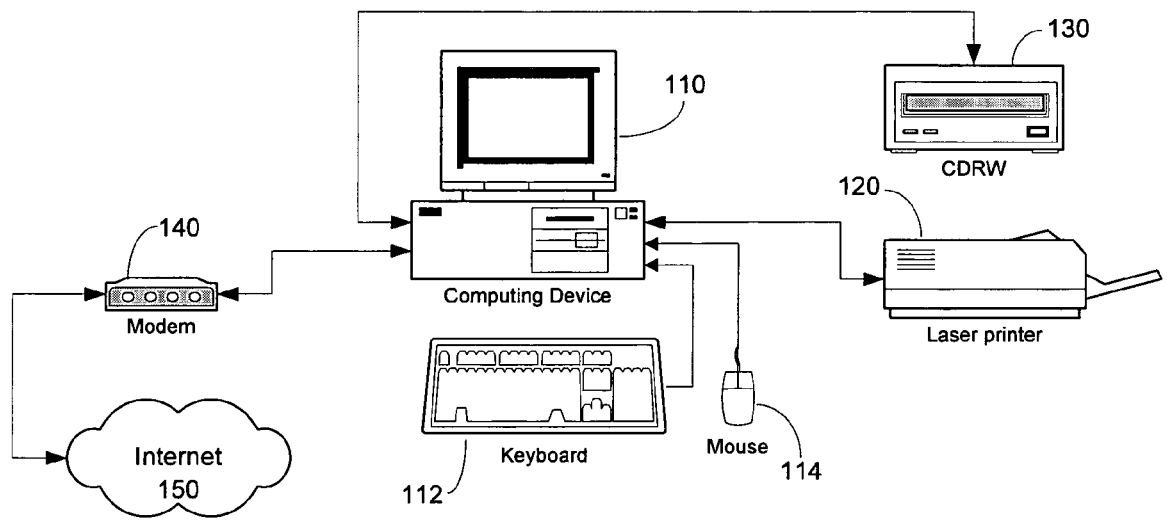
FIG. 1 is a diagram of a typical computer environment in which aspects of the invention are described.

FIG. 1 is an example of a basic personal computer system 100 with attached peripherals. In the system, a computing device 110 contains software (not shown) that has been used to establish communicative connections to the peripherals of the system. The user may communicate with the computing device 110 by means of the keyboard 112 and mouse 114. The user may operate software applications, such as word processor applications, that may utilize a printer 120 to be used as a hard copy device. Software copies of the files of an application may be stored or retrieved via a compact disc read write (CDRW) storage device 130. The user may utilize a communications program in conjunction with a browser to communicate to the internet 150 via a telephone or cable modem 140.

All of the peripheral devices represent some level of connectivity to functions and capability that affect the state of the computing device 110. The functionality of the computing device 110 is enhanced with the peripheral connectivity. If a user seeks help via a search of the help topics of any of his software applications or operating system, he may well be searching for information concerning his particular computing environment configuration. In other words, the state of his computing environment may produce a context from which to derive the most relevant help topic information to the users situation.

The present invention monitors the state of the computing environment and uses the individual states of the various components of the environment, including hardware, software, firmware, user preferences, software operating modes, and any other detectable state to provide a context to searches for information. The basic premise of the invention is that knowledge of the state of the computing environment can assist any search utility operating within such a system to find information, such as documents, that will be more relevant to the user in the computing environment.

The current invention uses a collection of monitors to provide context information. Each monitor tracks information about a particular state including whether it is currently true or false. States may be very simple like having a printer attached or complex like having an HP 770 printer attached that has low toner and is the current user's default printer. In one embodiment, the only states that are monitored are ones that have been explicitly requested by some application.

Examples of states which may be useful in determining the context of a search include hardware, software, and user preferences and controls. Hardware states may include the type, model, and make of hardware attached to the user computing device. Internet connection state, the local network and the presence of a shared printer, multiple displays, and the type of network are also examples of states in a computing environment. Examples of software states may be the version of operating system used or the application being run and the mode of the application such as editing a document or creating an equation for calculation in a spreadsheet. Examples of user related states include user preferences and conditions such as whether the user is a system administrator, whether the user has selected specific styles or modes in the generation or viewing of documents. Additional states representative of the computing environment may be monitored as new content is downloaded or new applications are installed.

One type of monitor may be an installed hardware monitor. The monitor may be used to indicate a state of specific hardware installed in the local computing environment. Based on the hardware monitors, results, such as the presentation of data resulting from help searches, may be modified. The modification may be of the form of an exclusion of search result data from presentation to the user. The modification may also involve the use of logical Boolean functions such as AND, OR and NOT in relation to data and the state of other monitors.

Figure 2:
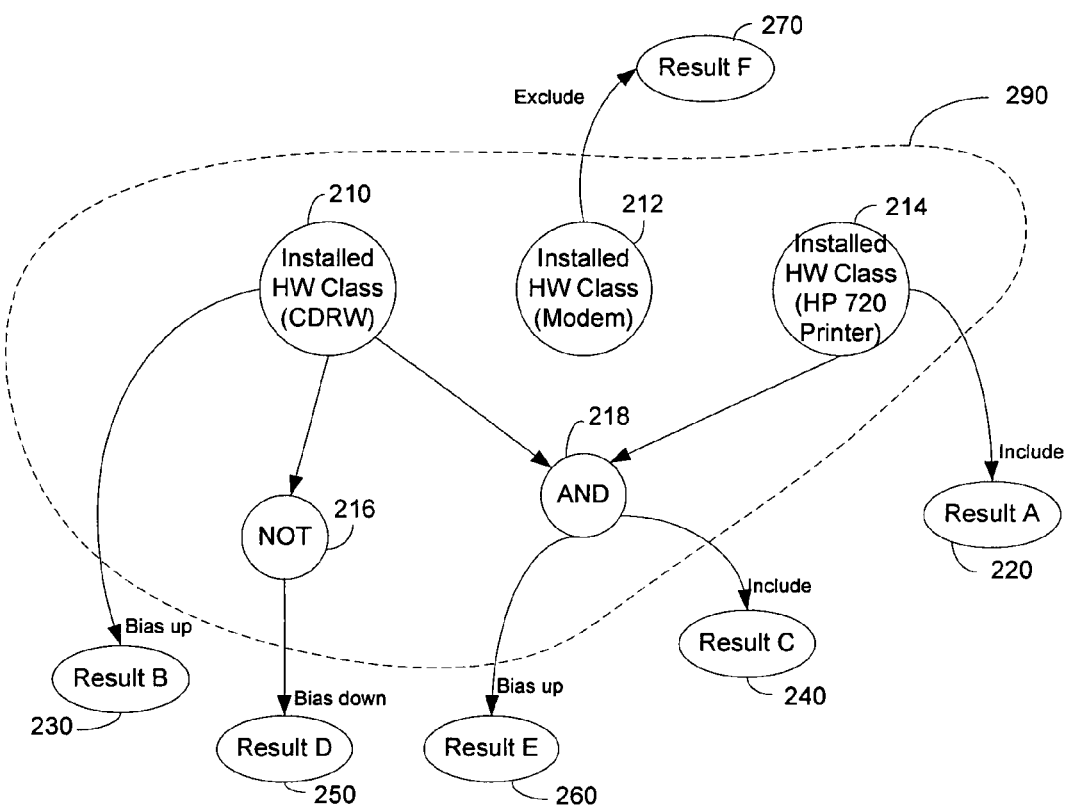
FIG. 2 is a diagram showing aspects of the current invention.

FIG. 2 represents the effect on results that state monitors may have. FIG. 2 contains three hardware monitors; one for a CDRW 210, one for a modem 212, and one for a printer 214. The monitors are made aware of the presence of their corresponding hardware in a system. If a query or search is made for instructions concerning troubleshooting the installation of a printer, then information concerning the troubleshooting of a HP 720 computer may be included in the Result A outcome 220 because that information may be relevant to the user. The potential relevance of this information to the user stems from the fact that the monitor 214 has detected that the computing environment includes an installed HP 720 printer. That knowledge may be applied to the Result A outcome to include information specific to the HP 720 printer troubleshooting procedure. The inclusion of this information in the Result A outcome may be applied to enhance the potential relevance of the returned information.

In another example, if a search for instructions on how to copy a file was issued, the hardware monitor 210 for the CDRW device may provide state information relevant to the Result B outcome 230. If the search is informed that the computing environment includes a CDRW, then the Result B outcome of the search on copying files using a CDRW device may be biased up or ranked higher in the list of returned help topics. Here, the fact that there is a state monitor that indicates the presence of a CDRW device acts to modify the search outcome for the Result B by biasing up the CDRW related information under the assumption that the user will want to use the current computing environment to perform the task of coping files.

Monitors can be used in a logical manner as well to sense the combined condition of multiple states within a computing environment to enhance searches. Given a search for information concerning the printing of a file to a printer, the search may use the state monitors for both the CDRW 210 as well as the HP printer 214 under a logical AND 218 function. Normally, the search may only provide information concerning printing a file to a printer. However, the file to be printed may be resident on the CDRW in the user's environment. Hardware monitor 210 and 214 together may indicate that not only information concerning generic file printing may be appropriate, but also information that specifically relates to printing a file from a CDRW to an HP 720 printer may also be relevant to the user. Thus, the information concerning the CDRW as well as the HP printer may be included in the search outcome of Result C 240.

Additionally, logical functions may be used to rank information provided by a search. For example, given a search for information concerning printing a file from a CDRW, then the state monitors 210 and 214 could contribute to the help results provided to the user. The information found in the search of the help topics may normally include printing from a CDRW to many different types of printers. However the logical AND 218 combination of the states monitors 210 and 214 suggest that because the computing environment actually contains a CDRW and an HP printer, then the specific help topic search results for printing a file from a CDRW to a HP 720 printer may be biased up or ranked high in the help results passed to the user. This may add relevance to the outcome of Result E 260 search results for the system user.

Another example of the use of a logical function is the use of the NOT 216 function. Given a search on how to connect a tape backup drive device to a user computer system, information on how to connect a CDRW device may be less relevant in this user environment because a CDRW device is already connected. Also, the request was specifically concerning a tape back up unit. Thus, information concerning the connection of a CDRW device may be biased down or ranked low on the delivered results to the user. This can occur because of the state knowledge of the monitor 210 as well as the logical NOT function 216 with regard to the search Result D 250.

In some instances, help topic information may be excluded completely from the results presented to the user. Given that a search concerned setting options in a world wide web browser, a state monitor 212 detecting the presence of a functional modem on the system could exclude some information returned by the search. This excluded information may be reflected in Result F 270. For example, if some information returned by the help topic search for "web browser option settings" was an instruction on how to connect a modem in order to connect to the Internet, then that specific information may be excluded from the Result F 270 presented to the user because the user environment is such that a viable connection already exists via an installed modem. This information is gleaned from state monitor 212 and is used to filter out or exclude information presented to the user on the basis that it is not relevant to the user's query on browser options.

Thus the FIG. 2 examples indicate how monitors may be used to modify the search information delivered to a user by applying the context of the computing environment to the search results. It is important to note that the state monitor information may be used either before or after a search is performed. In one embodiment, the search itself may be modified by applying the context provided by the state monitors to the search terms. Using this method, the search is performed after the context is added to the search terms. In another embodiment, the search is conducted first and the context is added in such a way as to modify the results of the search. In this manner the search terms that the user enters are used in the search and the context is added to modify the returned list. This latter case is the example of FIG. 2.

Using the principles of context as manifested by the use of monitors, there are multiple ways that context may be used to improve the user experience. One is to remove irrelevant results by filtering results of a search. Another is to maximize search (and browse) result relevance to the user. Another is to show appropriate help content by hiding/showing information. Another may be to make help wizards situationally appropriate. Another potential way to use context is to dynamically load/unload speech grammars for the most likely tasks to improve the precision of speech recognition. Context as used in searches may be particularly useful for typed queries since the words themselves are frequently ambiguous.

In order to use context to improve the user experience, an author may create an association between a particular state condition and a specific search or help topic. The association describes how the state condition affects the target search or help topic. The following paragraphs describe the different associations and the effects they achieve.

Figure 3:
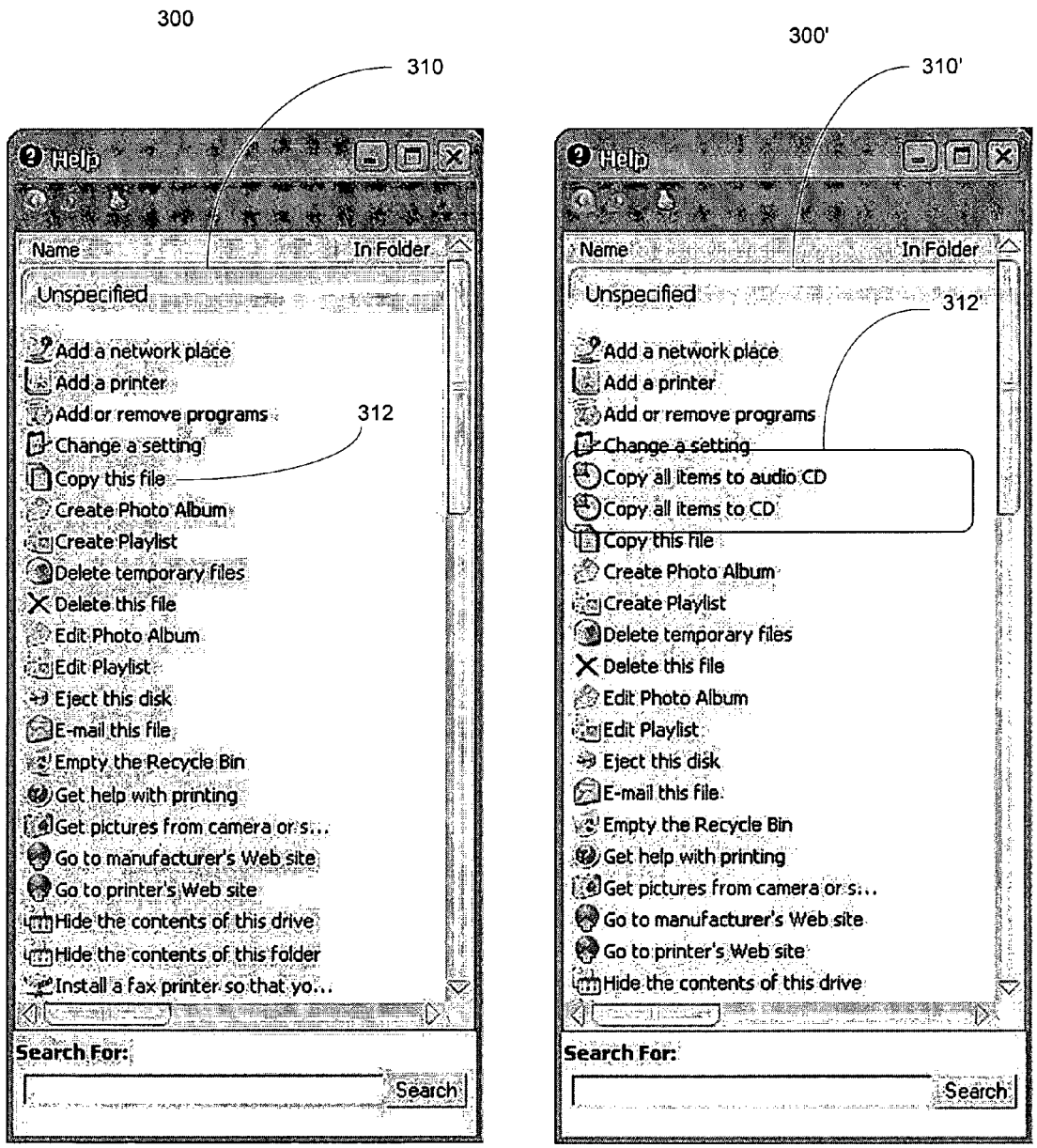
FIG. 3 is a screen shot depicting exclusion aspects of the current invention.

Filtering help and results may done by with an exclude association. This association establishes that when a particular state is false, the corresponding information should not be surfaced. FIG. 3 depicts an embodiment of the invention were the exclude function is manifested. A help topic display 300 contains a help topic window 310. In this example, a hardware monitor may detect that a CD drive is not installed in the computing environment. Thus the state is false that a CD drive is installed. As a result of the exclude function, the help topic of "Copy all items to audio CD" or "Copy all items to CD" is excluded from the help topic listing 310 and only the more generic "Copy this file" 312 help topic is displayed.

If a CD drive is installed on the computing environment, help topic display 300' may contain a help topic window 310'. In this instance, the hardware monitor detects that a CD drive is installed in the user's computing environment. Thus the state is true that a CD drive is installed. As a result, the help topics of "Copy all items to audio CD" or "Copy all items to CD" 312' is not excluded and may be displayed in the help topic listing 310'. Naturally, as is the nature of all software conditions, the sense of the state being either true or false for an activity to occur may be chosen by the implementer.

One manner to implement this behavior is to author the appropriate annotations and have the annotations for the monitor installed on the user's machine. An XML fragment for this particular exclude behavior may appear as follows:

```
<nameSpace name="System.Storage.Task">
  <type name="Task">
    <instance topic="Copy_to_audio_CD.1009799">
      <excludedBy>
        <state>
          <not>
<InstalledHardware xmlns='Microsoft.Shell.Monitors'>
  <string/>
  <DeviceType>CD-R/W</DeviceType>
</InstalledHardware>
          </not>
        </state>
      </excludedBy>
    </instance>
      <instance topic="Copy_to_CD.13789">
      <excludedBy>
        <state>
          <not>
<InstalledHardware xmlns='Microsoft.Shell.Monitors'>
  <string/>
  <DeviceType>CD-R/W</DeviceType>
</InstalledHardware>
```

-continued

```
          </not>
        </state>
      </excludedBy>
    </instance>
    ...Other instances
  </type>
</namespace>
```

The XML lines containing "instance" or "instance topic" tags are identifiers of particular tasks or results. The annotations may be stored seperately from the instance in order to ensure that the annotating content may not be changeable. The "excluded by" tags indicates that the task or retrieved information should be excluded from the final results. The lines of XML code between the state tags describe the state condition. When installed, the annotations of the above XML code may be stored in an appropriate software location such as in the WinFS (Windows File System). At runtime, state conditions are extracted and cause the creation of monitors to track those states. Both of these annotations may share the same monitor object; a NOT object that is dependent on the installed hardware monitor that checks for CDRW drives.

Sometimes filtering can be misleading or confusing and it may be a better design choice to use context to affect the ranking of results. This can be done by correlating state using a bias-up or bias-down association. For example, if there is no digital camera currently connected in the users computing environment, then results having to do with a camera are less likely to be relevant to the user and should be lower in the ranking than they would be otherwise. Lower ranked search results, or help topics, may be listed lower on the list of returned documents provided to the user to affect the relevance imparted to that topic from the monitor which detects the presence of digital cameras.

In one embodiment, the invention uses a singleton object to cache each unique piece of state and to use runtime delegates to propagate state changes. A new monitor can be defined by implementing an interface or, more typically, by deriving a monitor from the set of base classes described below. In addition, other classes may be generated which may provide services such as mapping from XML to a corresponding primitive monitor instance. This class service may involve dynamically loading the monitor's assembly. Another service may restrict initial monitor evaluation time and minimum allowed polling time. Also, class services may be erected which may declaratively compose together multiple monitors using logical AND, OR, and NOT functions as well as variables.

There are a number of base classes that are provided with respect to the authoring of monitors for the invention. The base classes are as follows:

Base Monitor—Provides singletons and dependency tracking.

No Polling Monitor—Prevents polling for event/push monitors.

Windows Event Monitor—Listens for specific windows events.

Hardware Monitor—Listens for device change events.

Registry Monitor—Listens for Registry key changed events.

Setting—Application push monitors for simple settings

IntSetting

DoubleSetting

StringSetting

A monitor is always evaluated when it is initially created. After that there are at least four ways that a monitor can get re-evaluated. First, an external event may trigger the monitor to re-evaluate the selected state. The monitor may be constructed to register for the external event. For example, any instance of Hardware Monitor is automatically re-evaluated when windows raises WM_DEVICECHANGE or WV_DEVMODECHANGE events.

A second way a monitor can re-evaluate its state is based on a time based event occurrence. Monitors can be setup to poll on a particular interval. A third method of updating a monitor is that an application explicitly changes state values in a monitor. For example any instance of IntSetting re-evaluates whenever the associated integer value is changed. A fourth way a monitor may be re-evaluated is that a value of a dependent monitor changes. Whenever a monitor changes its truth value or associated values, any monitors that depend on that monitor are also re-evaluated.

Defining a primitive monitor under the invention involves defining one or more constructors to create class instances. Another definition may involve a public static monitor method that has the same signature as the constructors. The base class may call constructors and insure that each unique combination of monitor parameters corresponds to a single object. Another definition involves using a protected_evaluate method which evaluates the state. The method is protected because the base class has a public_evaluate method that takes care of thread safety. Calling the SetIsTrue method at the end of the evaluation will check to see if the truth value has changed and if so, propagate the change to any more complex monitors using delegates.

The example below is a monitor definition to track whether the current user is a system administrator.

```
public class IsUserAdmin : BaseMonitor
{
    public static IsUserAdminMonitor Monitor( )
    {
        return FindMonitor(typeof(IsUserAdminMonitor))
    as IsUserAdminMonitor;
    }
    public IsUserAdminMonitor( ) : base( )
    { }
    protected override bool_Evaluate( )
    {
        WindowsPrincipal winPrin =
    new WindowsPrincipal(WindowsIdentity.GetCurrent( ));
    return
    SetIsTrue(winPrin.IsInRole(WindowsBuiltInRole.Administrator));
    }
}
```

A primitive monitor may be started via a service class. The service class provides a way to map from an XML description of the state condition to the corresponding singleton for that piece of state. For example, code to start monitoring IsUserAdmin from above would look like:

```
Service service = new Service( );
    service.Monitor(
"<IsUserAdmin xmlns='Microsoft.Shell.Monitors'/>");
```

The above code would return the IsUserAdmin singleton. In the XML syntax, the monitor class becomes the element name and the XML namespaces are used to provide information about namespaces and assemblies in a runtime system.

The example above assumes that the assembly containing Microsoft.Shell.Monitors.IsUserAdmin is already loaded. The service is also capable of automatically loading an assembly if the namespace includes a fully qualified name such as:

Microsoft.Shell.Monitors, MSExplorer, Version=1.0.0.0, Culture=neutral, PublicKeyToken=null It maybe useful to generate a single monitor class which is capable of creating many different singletons. For example, we have a class InstalledHardwareMonitor that permits testing for any combination of manufacturer, device type, display name and device identifier. There are four different Monitor overloads which go from supplying just the manufacturer up to specifying all four. The XML to check to see if there is a 3Com™ network adapter installed would look like:

```
<InstalledHardware>
    <string>3Com</string>
    <string>Network adapters</string>
</InstalledHardware>
```

The above code would result in the singleton for that piece of state. Each different combination of parameters would result in a different singleton.

Some state changes may only be detected by occasionally polling the information. Polling may be setup either when a monitor is defined or through the XML description of a state. For example, to poll IsUserAdmin every ten minutes, the following XML code may be used:

<IsUserAdmin xmlns='Microsoft.Shell.Monitors' polling'0:10:0'/>

Monitors can be composed using logical operators such as AND, OR, and NOT tags in XML. Just like other monitors logical monitors are singletons for each normalized combination of operands. Below are some example combinations.

```
// True if they are not an admin
<not> <IsUserAdmin xmlns='Microsoft.Shell.Monitors'/> </not>
// True if they are an admin and the default browser is Internet Explorer
<and xmlns='Microsoft.Shell.Monitors'>
  <IsUserAdmin/>
  <DefaultBrowser>
      <AllowedBrowserTypes>InternetExplorer</AllowedBrowsetTypes>
  </DefaultBrowser>
</and>
```

Logical expressions are useful for dealing with state conditions as Booleans, but some states contain additional runtime information such as variables and tests. For example, we could create a state condition to track if the current window has .jpg files selected by the following XML.

```
<and>
    <CurrentWindow>
      <variable name='window' path='Window'/>
    </CurrentWindow>
    <SelectedFiles>
        <binding type='SelectedFile'>
          <variable name='window' path='Window'/>
          <variable name='extension' path='FileExtension'/>
        </binding>
    </SelectedFiles>
    <eq var='extension' string='jpg'/>
</and>
```

In one aspect of the invention, whenever two variables have the same name, they must evaluate to the same value. The first variable statement accesses the value from a class CurrentWindow.Window. The SelectedFiles monitor has a collection of SelectedFile objects each of which has a Window and FileExtension property. The <binding> clause may extract the variable pairs from each SelectedFile found in the collection. Finally the matching values for extension are checked against the constant. The whole clause is only true if there is a set of variable bindings that match all of the conditions. The <and> clause itself will contain all of the matching bindings which can be accessed programmatically or tested in other Boolean clauses.

The monitoring service also allows creating re-useable state conditions. For example, using the previous example and determining a parameterized rule by defining a name and signature for the rule such as:

```
MyApp.SelectedExtension (string MatchExtension)
The body may then be defined like as:
<and>
   <CurrentWindow>
      <variable name='window' path='Window'/>
   </CurrentWindow>
   <SelectedFiles>
         <binding type='SelectedFile'>
         <variable name='window' path='Window'/>
         <variable name='extension' path='FileExtension'/>
         </binding>
   </SelectedFiles>
   <eq var='extension' string='MatchExtension'/>
</and>
Invoking this rule using XML may appear as:
<SelectedExtension xmlns='MyApp'>
   <string>jpg</string>
</SelectedExtension>
```

The parameter value may be substituted for 'MatchExtension' in the body of the code above and the result may be evaluated like any other XML state condition.

Figure 4:
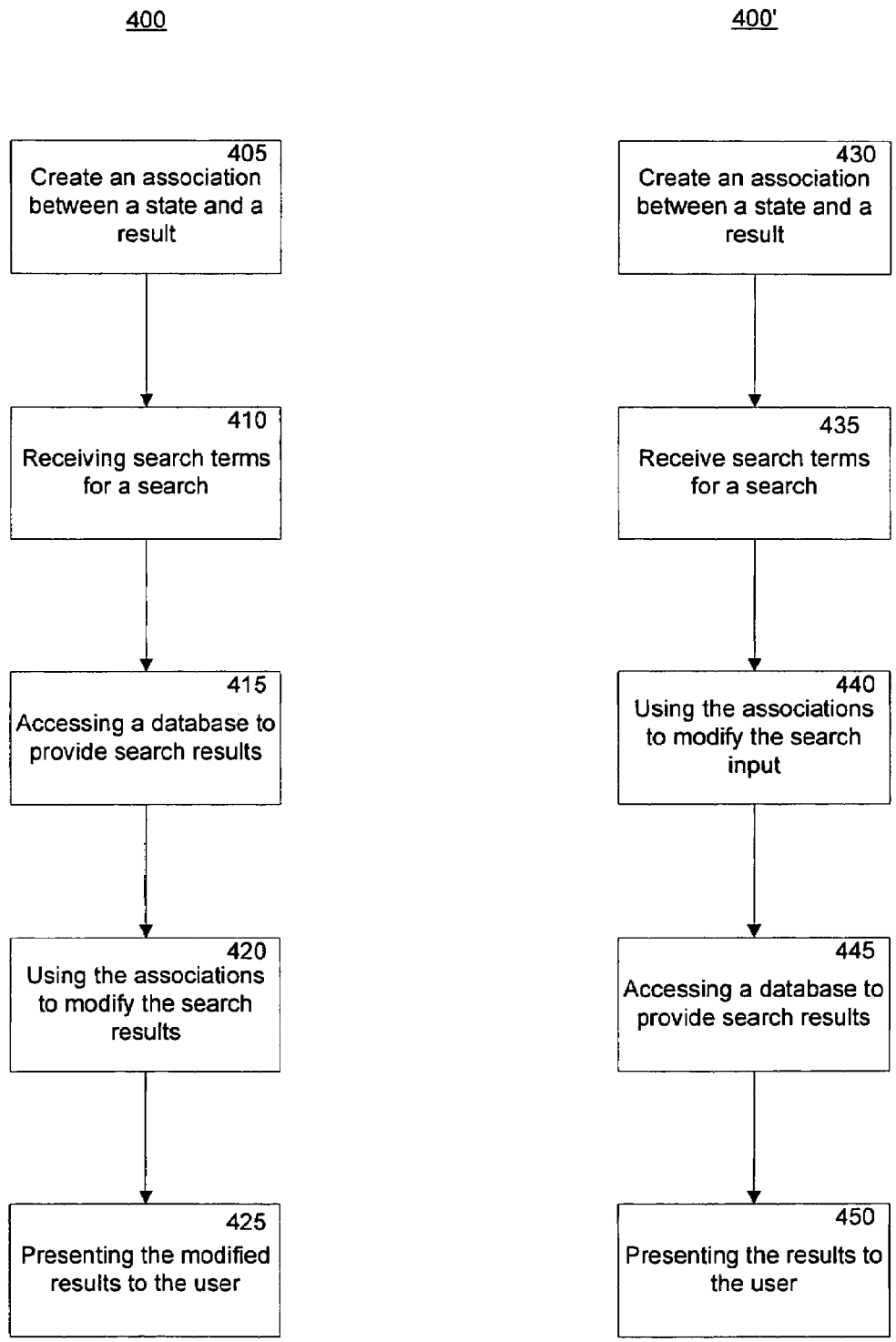
FIG. 4 is a flow diagram showing a process of the current invention.

FIG. 4 depicts a flow diagram of a process 400 of the invention where post-processing of the search results with the context information from the state monitors occurs. Initially, monitors are generated to create an association between a state and a result (step 405). After the monitors are generated for the computing environment, search terms may be received (step 410) where the user wishes to search for information relevant to his computing environment. The search engine used access a database to obtain search results (step 415). Once the search results are generated using the search terms provided by the user, the associations generated in step 405 may be used to modify the search results (step 420). In general, the modification to the search results may be to exclude specific results, bias up in ranking specific results, or bias down in ranking some other specific results. In addition, the modification may include logical operators where one or more logical operators are used to combine monitored states to provide context before exclusion or bias ranking occurs. Upon the completion of modification of the search results, a final list of results may be produced and presented to the user for his review (step 425). This process 400 utilizes the state monitors of the current invention to perform post-processing on search results. However, the general principles may also be applied to modify the search itself.

FIG. 4 also depicts a flow diagram of a process 400' of the invention where pre-processing of the search terms with the context information from the state monitors occurs. Initially, monitors are generated to create an association between a state and a result (step 430). This step is similar to that of step 405 of the post-processing embodiment. After the monitors are generated for the computing environment, search terms may be received (step 435) where the user wishes to search for information relevant to his computing environment. Now, in this pre-processing embodiment, the search terms themselves may be modified before the search is performed (step 440). The modification of the search terms may use the principles of using context in the form of state information from monitors and applying that state information to include or exclude search terms or logical combinations of search terms to provide a modified search. Having the modified search terms, a search is performed by accessing a database of information to provide the search results (step 445). The search results may then be presented to the user for review (step 450).

Exemplary Computing Device

Figure 5:
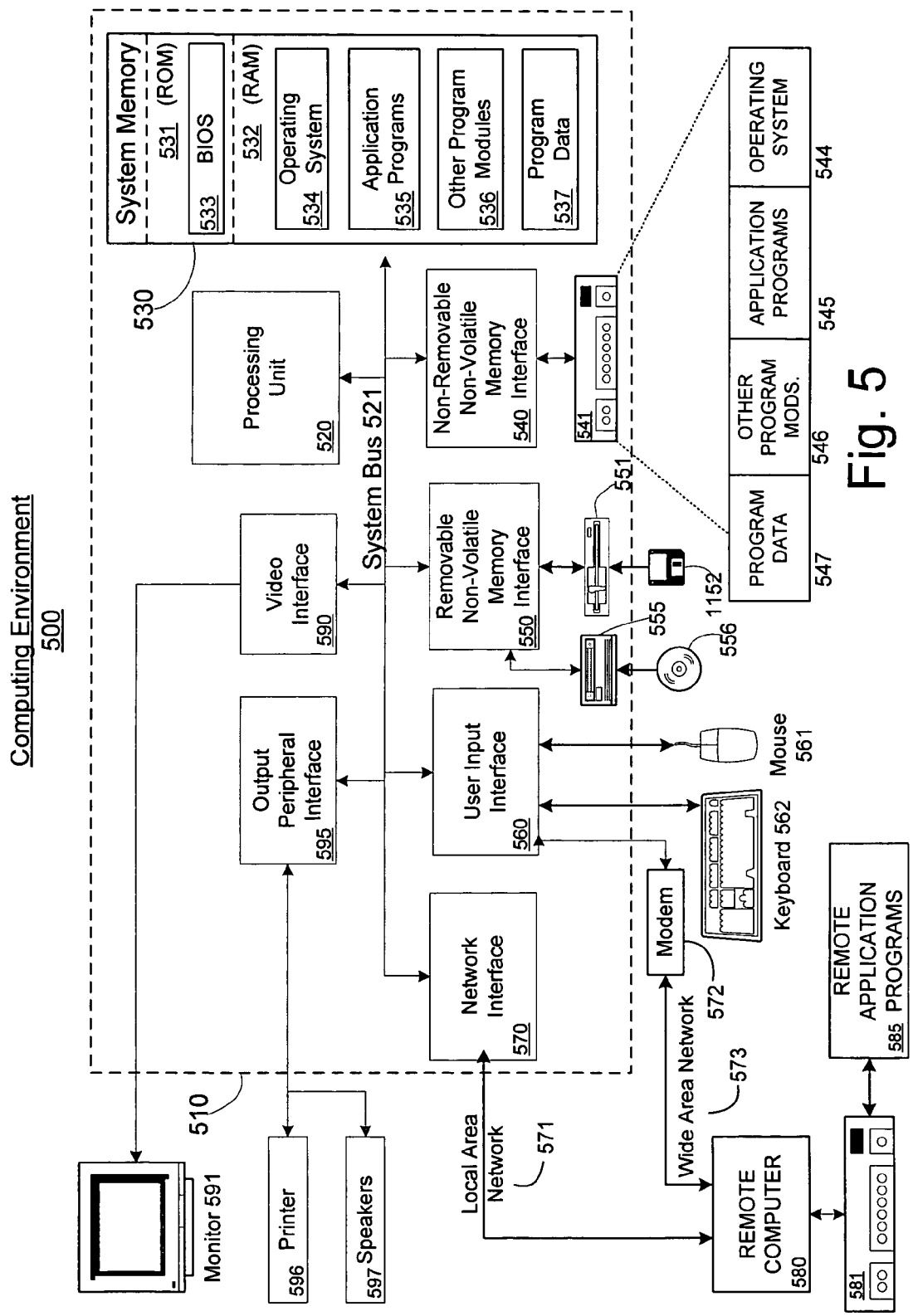
FIG. 5 is a block diagram showing an exemplary computing environment in which aspects of the invention may be implemented.

FIG. 5 and the following discussion are intended to provide a more complete general description of a suitable computing environment in which the invention may be implemented than that shown in FIG. 1. It should be understood, however, that handheld, portable and other computing devices and computing objects of all kinds are contemplated for use in connection with the invention. Thus, while a general purpose computer is described below, this is but one example, and the invention may be implemented with other computing devices, such as a client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 5 thus illustrates an example of a suitable computing system environment 500 in which the invention may be implemented, although as made clear above, the computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

With reference to FIG. 5, an exemplary system for implementing the invention includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/ buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement context in conducting searches. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the discussed invention. Additionally, any storage techniques used in connection with the invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the invention should not be limited to any single embodiment, but rather should be construed in breadth and scope in accordance with the appended claims.

What is claimed is:

1. A computer-implemented method for using state information of components in a computing environment as context to modify retrieved information, the method comprising:

creating a plurality of state associations that relate any particular state with at least one result, wherein at least one association comprises an association to exclude information corresponding to a first state, wherein a particular state comprises at least one of a hardware state, an operating system condition, a user preference, or a software application operating parameter;

receiving a search request;

retrieving, from a database, information related to the search request; and modifying the information retrieved in accordance with the at least one state association if the at least one result is related to the retrieved information, wherein the association to exclude prevents information corresponding to a first state from appearing as modified information;

wherein context is applied to the retrieved information using the state information of the components in the computing environment, wherein the state information comprises the group consisting of a hardware component state and a software component operating mode state; and presenting the modified information on a computer display.

2. The method of claim 1, wherein creating at least one state association comprises using a monitor to determine the particular state and correlating the particular state with at the at least one result that is affected by the particular state.

3. The method of claim 1, wherein creating at least one state association comprises correlating a state with a help topic in a software program.

4. The method of claim 1, wherein retrieving information related to a search request comprises searching in a database of help topics and returning information based on the search request.

5. The method of claim 1, wherein modifying the information retrieved further comprises using one or more of logical operators and variables in conjunction with two or more state monitors before applying the step of excluding.

6. A computer system for a including context in a search for information, the system having at least one monitor that detects state information of hardware and software components in the system, the system comprising:

a processor having access to memory, the memory having instructions which, when executed, perform the method comprising:

creating a plurality of state associations that relate any particular state with at least one result, wherein at least one association comprises an association to exclude information corresponding to a first state, wherein a particular state comprises at least one of a hardware state, an operating system condition, a user preference, or a software application operating parameter;

receiving a search request;

retrieving, from a database, information related to the search request; and modifying the information retrieved in accordance with the at least one state association if the at least one result is related to the retrieved information, wherein the association to exclude prevents information corresponding to the first state from appearing as modified information;

wherein context is applied to the retrieved information using the state information of the components in the computer system, wherein the state information comprises the group consisting of a hardware component state and a software component operating mode state; and a display device wherein the modified information is presented for review.

7. A computer-readable storage medium having computer-executable instructions for performing a method for including state context into search results, the method performed using state information of components in a computing environment, the method comprising:

creating a plurality of state associations that relate any particular state with at least one result, wherein at least one association comprises an association to exclude information corresponding to a first state, wherein a particular state comprises at least one of a hardware state, an operating system condition, a user preference, or a software application operating parameter;

receiving a search request;

retrieving from a database information related to a search request; and modifying the information retrieved in accordance with the at least one state association if the at least one result is related to the retrieved information, wherein the association to exclude prevents information corresponding to the first state from appearing as modified information;

wherein context is applied to the retrieved information using the state information of the components in the computing environment, wherein the state information comprises the group consisting of a hardware component state and a software component operating mode state; and presenting the modified information on a computer display.

8. The computer-readable storage medium of claim 7, wherein the method step of creating at least one state association comprises using a monitor to determine the particular state and correlating the particular state with at the at least one result that is affected by the particular state.

9. The computer-readable storage medium of claim 7, wherein the method step of creating at least one state association comprises correlating a state with a help topic in a software program.

10. The computer-readable storage medium of claim 7, wherein the method step of retrieving information related to a search request comprises searching in a database of help topics and returning information based on the search request.

11. The computer-readable storage medium of claim 7, wherein the method step of modifying the information retrieved further comprises using one or more of logical operators and variables in conjunction with two or more state monitors before applying the at least one step of excluding.

12. The method of claim 1, wherein modifying the information retrieved comprises:

biasing up a first selected item of the retrieved information by assigning the first selected item with a high ranking, whereby the first selected item is placed near the top a list of modified information.

13. The method of claim 12, wherein modifying the information retrieved further comprises using one or more of logical operators and variables in conjunction with two or more state monitors before applying the step of biasing up.

14. The method of claim 1, wherein modifying the information retrieved comprises:

biasing down a second selected item of the retrieved information by assigning the second selected item with a low ranking, whereby the second selected item is placed away from the top of a list of modified information.

15. The method of claim 14, wherein modifying the information retrieved further comprises using one or more of logical operators and variables in conjunction with two or more state monitors before applying the step of biasing down.

16. The computer-readable storage medium of claim 7, wherein the step of modifying the information retrieved comprises:

biasing up a first selected item of the retrieved information by assigning the first selected item with a high ranking, whereby the first selected item is placed near the top a list of modified information.

17. The computer-readable storage medium of claim 16, wherein the step of modifying the information retrieved further comprises using one or more of logical operators and variables in conjunction with two or more state monitors before applying the step of biasing up.

18. The computer-readable storage medium of claim 7, wherein the method step of modifying the information retrieved comprises:

biasing down a second selected item of the retrieved information by assigning the second selected item with a low ranking, whereby the second selected item is placed away from the top of a list of modified information.

19. The computer-readable storage medium of claim 18, wherein the step of modifying the information retrieved further comprises using one or more of logical operators and variables in conjunction with two or more state monitors before applying the step of biasing down.

* * * * *